US 9,870,651 B1

(12) United States Patent
Keppy

(10) Patent No.: US 9,870,651 B1
(45) Date of Patent: Jan. 16, 2018

(54) DIAGNOSTIC TESTING OF RAPID HEAT UP OF AN EXHAUST SYTEM DURING ENGINE DECOMPRESSION

(71) Applicant: Robert Bosch GmbH, Stuttgart (DE)

(72) Inventor: Brent Keppy, Waterford, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/218,686

(22) Filed: Jul. 25, 2016

(51) Int. Cl.
  *G07C 5/08* (2006.01)
  *G01M 15/04* (2006.01)

(52) U.S. Cl.
  CPC ......... *G07C 5/0808* (2013.01); *G01M 15/046* (2013.01)

(58) Field of Classification Search
  CPC .................. G07C 5/0808; G01M 15/046
  See application file for complete search history.

(56) References Cited

U.S. PATENT DOCUMENTS

| 6,202,406 | B1 | 3/2001 | Griffin et al. |
| 6,792,346 | B2 | 9/2004 | Takebayashi et al. |
| 8,327,624 | B2 * | 12/2012 | Kwon ............... F01N 3/033 60/286 |
| 8,820,049 | B2 | 9/2014 | Lewis |
| 8,863,497 | B1 | 10/2014 | Legare |
| 2008/0245342 | A1 | 10/2008 | Werner |
| 2012/0131905 | A1 | 5/2012 | Kwon |

\* cited by examiner

*Primary Examiner* — Anne M Antonucci
(74) *Attorney, Agent, or Firm* — Michael Best & Friedrich LLP

(57) ABSTRACT

A method and a device for performing diagnostics on a vehicle. The diagnostic system includes a sensor configured to sense an operating speed of an engine of the vehicle, a diagnostic output device, and an electronic processor. The electronic processor is communicatively coupled to the sensor and the diagnostic output device. The electronic processor is configured to activate and deactivate a decompression mode of the engine. The electronic processor acquires the operating speed of the engine from the sensor and determines an engine roughness based on the operating speed of the engine. When the engine roughness is below a threshold, the electronic processor sends a diagnostic signal to the diagnostic output device.

18 Claims, 4 Drawing Sheets

DIAGNOSTIC TESTING OF RAPID HEAT UP OF AN EXHAUST SYTEM DURING ENGINE DECOMPRESSION

BACKGROUND

Modern vehicles incorporate various types of emission-reduction techniques within an exhaust system to reduce environmentally-harmful emissions. In some cases, exhaust systems are designed to reduce undesirable byproducts of combustion including nitrous oxide emissions from diesel engines. These exhaust systems may be highly sensitive to operating temperature of the exhaust system. For example, during cold starts of a diesel engine, the exhaust system including a selective catalytic reduction (SCR) system may be below an optimum temperature for proper treatment of exhaust gasses. It may take several minutes before the exhaust system reaches a steady-state operating temperature where emission reduction operates efficiently.

Several types of vehicle systems and strategies have been developed that rapidly heat up the exhaust system to reduce the time that the exhaust system runs at temperatures inefficient for exhaust gas treatment. However, these vehicle systems do not have built-in diagnostics that indicate whether rapid heat up is being properly performed. Therefore, a lack of reduction of harmful emissions may occur due to a lack of or delay in heating, which may not be noticed or remedied by a driver of the vehicle.

SUMMARY

Some embodiments provide a system and a method that detect and provide diagnostics of malfunctions occurring with rapid heat up (RHU) of an exhaust system. Embodiments also enable and disable decompression of a diesel engine to control rapid heat up of the exhaust system. In some embodiments, enabling and disabling decompression of the diesel engine may include enabling or disabling compression release braking (CRB or "Jake Brakes"). In other embodiments, enabling and disabling decompression of the diesel engine may include enabling or disabling rocker stop devices (RSD). In general, embodiments relate to various engine decompression techniques when combustion is not occurring.

In one example, embodiments provide a system and a method that, based on the state or "operating mode" of the engine (for example, active decompression or inactive decompression), the exhaust system temperature, and the engine roughness, an engine control unit, which includes an electronic processor, performs diagnostics relating to rapid heat up of the exhaust system.

One embodiment provides a diagnostic system for monitoring a vehicle. The diagnostic system includes a sensor configured to sense an operating speed of an engine of the vehicle, a diagnostic output device, and an electronic processor. The electronic processor is communicatively coupled to the sensor and the diagnostic output device. The electronic processor is configured to activate and deactivate a decompression mode of the engine. In addition, the electronic processor acquires the operating speed of the engine from the sensor and determines an engine roughness based on the operating speed of the engine. When the engine roughness is below a threshold, the electronic processor sends a diagnostic signal to the diagnostic output device.

Another embodiment provides a method of performing diagnostics for a vehicle. The method includes activating, by an electronic processor, a decompression mode of the engine. The electronic processor acquires an operating speed of the engine from a sensor. The electronic processor then determines an engine roughness based on the operating speed of the engine and sends a diagnostic signal to a diagnostic output device when the engine roughness is below a predetermined threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A plurality of hardware and software based devices, as well as a plurality of different structural components may be used to implement embodiments of the invention. In addition, embodiments may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, aspects of the invention may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the components.

Although not illustrated, embodiments of the invention relate to varies types of vehicles including those powered by diesel engines. For example, the diagnostic system 100 may be equipped on trucks, semi-tractors, construction vehicles, automobiles, and the like. The diagnostic system 100 includes various components that may also be considered components of other vehicle systems. For example, the diagnostic system 100 incorporates components within an exhaust system, a diesel engine, and an engine control unit. In particular, the diagnostic system 100 enables the use of engine decompression to cause rapid heat up of the exhaust system and monitors the engine decompression based, at least in part, on engine speed as described in detail below.

Figure 1:
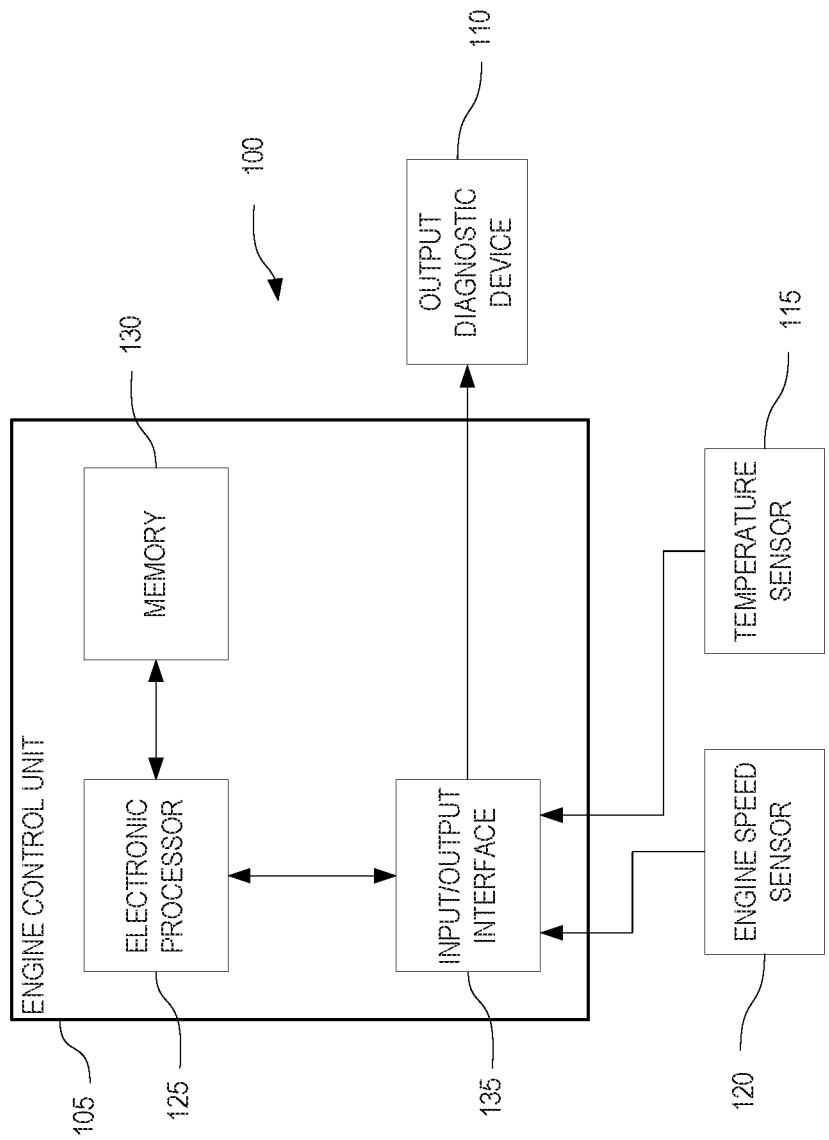
FIG. 1 is a block diagram of a diagnostic system for rapid heat up of an exhaust system according to one embodiment.

FIG. 1 illustrates components of a diagnostic system 100 according to one exemplary embodiment. In the example illustrated, the diagnostic system 100 includes an engine control unit 105, an output diagnostic device 110, a temperature sensor 115, and an engine speed sensor 120. The engine control unit 105 includes a plurality of electrical and electronic components that provide power, operation control, and protection to the components and modules within the engine control unit 105. The engine control unit 105 includes, among other things, an electronic processor 125 (such as a programmable electronic microprocessor, microcontroller, or similar device), a memory 130 (for example, a non-transitory, machine-readable memory), and an input/output interface 135. The electronic processor 125 is communicatively coupled to the memory 130 and is configured to retrieve from memory 130 and execute, among other things, instructions related to processes and methods described herein. The engine control unit 105 may include additional, fewer, or different components than those illustrated. For example, the engine control unit 105 may be implemented in multiple electronic control units each configured to perform specific functions or sub-functions relating to control and monitoring of the engine and the exhaust system. Additionally, the engine control unit 105 may communicate information relating to the diagnostic system 100 and methods of controlling the diagnostic system 100 to other electronic control units or modules of the vehicle.

In the example illustrated, the engine control unit 105 is communicatively coupled to the output diagnostic device 110, the temperature sensor 115, and the engine speed sensor 120 via the input/output interface 135. In particular, the input/output interface 135 is configured to receive and acquire a signal indicative of engine position and engine speed from the engine speed sensor 120 and a signal indicative of a temperature of a portion of an exhaust system of the vehicle (for example, a temperature of a selective catalytic reduction bed) from the temperature sensor 115. In coordination with the electronic processor 125 and memory 130, the input/output interface 135 generates and sends a signal to the output diagnostic device 110 indicative of any errors or malfunctions occurring within the diagnostic system 100 or by any components monitored by the diagnostic system 100.

In some embodiments, the output diagnostic device 110 includes an indicator that indicates one or more malfunctions of the diagnostic system 100. For example, the output diagnostic device 110 may display the one or more malfunctions to the driver of the vehicle with, for example, a warning light such as a check engine light or a warning icon on a display. The output diagnostic device 110 may also provide an indication of the one or more malfunctions to an internally-located or externally-located troubleshooting tool, which in some embodiments, includes transmitting a wired or wireless signal to the troubleshooting tool. In some embodiments, the engine control unit 105, the output diagnostic device 110, or both generate an error code or message indicative of the one or more malfunctions to the indicator, the troubleshooting tool, or to other vehicle systems. The output diagnostic device 110 may be activated by the engine control unit 105 based upon analysis of signals from the engine speed sensor 120 as discussed below.

The engine control unit 105, the output diagnostic device 110, the temperature sensor 115, and the engine speed sensor 120 may be communicatively linked through a direct wired connection, a wireless connection, or by one or more communication modules on a vehicle communication bus. For example, in some embodiments, the input/output interface 135 communicates by means of a protocol such as J1939 or controller area network (CAN) bus. In some embodiments, the input/output interface 135 is communicatively coupled with the engine speed sensor 120 over a high-speed signal line that enables the engine control unit 105 to perform high speed capture and processing of the engine speed signal. As a consequence, the engine control unit 105 may determine precise position and speed parameters of a crankshaft of the engine during operation. In some embodiments, precise position and rotational speeds are necessary for accurate determination of segment times relating to changes in the speed of rotation of the crankshaft.

Figure 2:
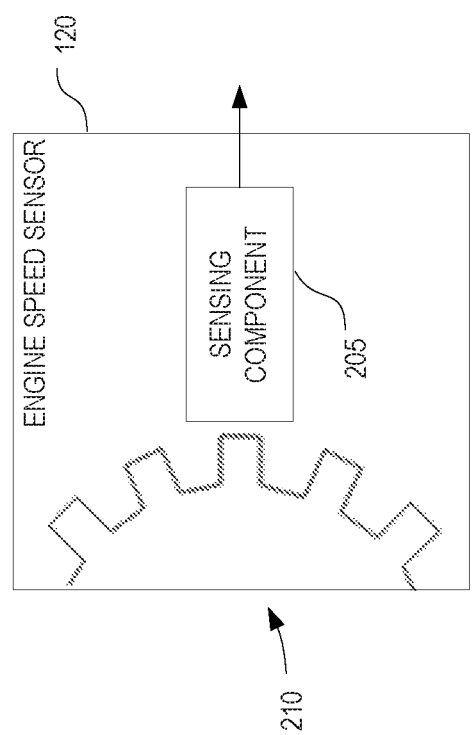
FIG. 2 is a block diagram of an engine speed sensor of the diagnostic system of FIG. 1 according to one embodiment.

FIG. 2 illustrates one example construction of the engine speed sensor 120. In this example, the engine speed sensor 120 includes a sensing component 205 and a toothed ring 210. The toothed ring 210 rotates synchronously with a crankshaft or a camshaft of the engine, and the sensing component 205 produces a signal dependent on the position and motion of the toothed ring 210. For example, as each tooth of the toothed ring 210 passes by the sensing component 205, a magnitude of the signal produced by the sensing component 205 reaches a maximum value. As a consequence, the signal from the sensing component 205 to the engine control unit 105 is indicative of a period of time (i.e., a segment time) in between each tooth passing by the sensing component 205. The engine control unit 105 analyzes the signal from the engine speed sensor 120 to determine the segment time and to determine a magnitude of a change in segment time for each tooth of the toothed ring 210 to pass the sensing component 205. As a consequence, the engine control unit 105 may determine an engine roughness as a value indicative of an amount or frequency of speed changes of the engine (for example, of the crankshaft).

In particular, engine roughness may be considered a measure of the difference or changes in segment times over multiple rotations or engine cycles. Therefore, the engine roughness indicates instantaneous acceleration or deceleration caused from combustion, misfire, engine valve timing, and the like. When the engine roughness is high, this indicates misfires or other engine performance issues. When engine roughness is low, this indicates that the engine may be coasting with an inactive fuel supply. Some level of engine roughness naturally occurs from engine valve actuation and normal engine compression as the piston compresses the cylinder charge. In the instance where compression is prevented (by, for example, activating decompression), the engine roughness is naturally much reduced. In a similar example, a compression release brake will significantly change the engine roughness due to the early intake or exhaust valve opening from the device. As a consequence, when the engine roughness is at a low value, the engine control unit 105 is capable of verifying proper engine decompression, and therefore, proper operation of the engine intake or exhaust valves and the rapid heat up functionality. Conversely, when the engine roughness is not at a low value during the decompression mode, the engine control unit 105 may detect and diagnose improper engine valve operation and failure of the rapid heat up function.

Figure 3:
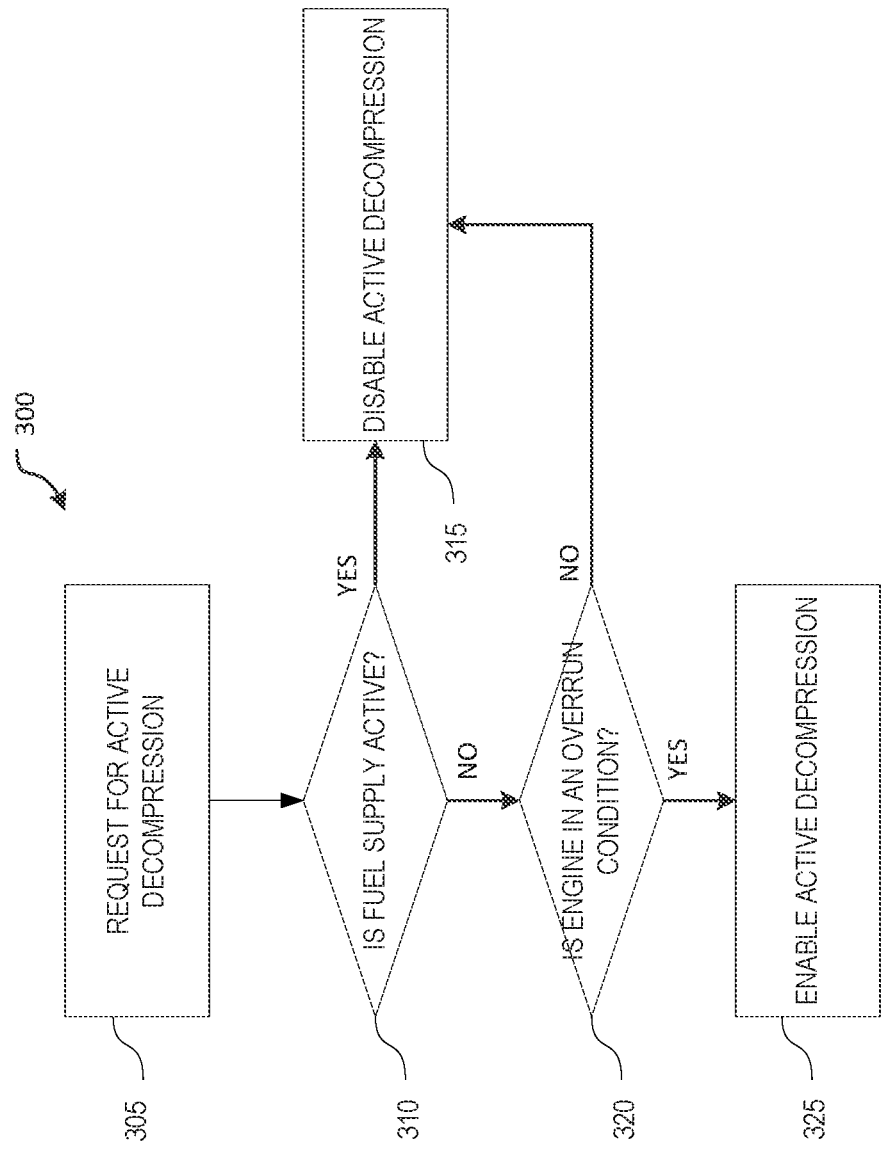
FIG. 3 is a flowchart of a method of controlling engine decompression with an engine control unit of the diagnostic system of FIG. 1 according to one embodiment.

FIG. 3 illustrates a method 300 of operating the diagnostic system 100 according to one embodiment. In the method 300, the engine control unit 105 receives a request for active decompression (block 305). In some embodiments, the request for active decompression is generated by the driver (for example, by switching on engine braking). In some embodiments, the engine control unit 105 receives the request for active decompression from a separate electronic control unit (for example, an electronic control unit for the exhaust system). For example, a request for active decompression may occur when the exhaust system requests a rapid heat up due low exhaust temperature. In this case, the exhaust system requests active decompression to assist the exhaust system in reaching a target temperature setting faster than without active decompression. Alternatively, in some embodiments, the engine control unit 105 itself may generate the request for active decompression based on various inputs. For example, the engine control unit 105 may receive a temperature signal from the temperature sensor 115 indicating that the exhaust system is below proper operating temperature (for example, the temperature sensor senses an operating temperature below a predetermined temperature threshold). When this occurs, the engine control unit 105 internally generates the request for active decompression. A request for active decompression may also occur during engine start up or stop in the case of rocker stop devices.

In some embodiments, the request for active decompression may immediately activate an engine decompression mode. However, in other embodiments, the engine control unit 105 performs several status checks before allowing decompression to occur. For example, the engine control unit 105 may determine if the fuel supply is active (block 310), which in some cases includes determining if the throttle is open. When the fuel supply is active, the engine control unit 105 may disable active decompression (block 315). In addition, the engine control unit 105 may also determine if the engine is in an overrun condition before allowing active decompression, and thus engine braking (block 320). In particular, when the vehicle is not in an overrun condition, the engine control unit 105 may disable active decompression (block 315). Conversely, when the vehicle is in an overrun condition, the engine control unit 105 may enable active decompression, and thus engine braking (block 325).

Figure 4:
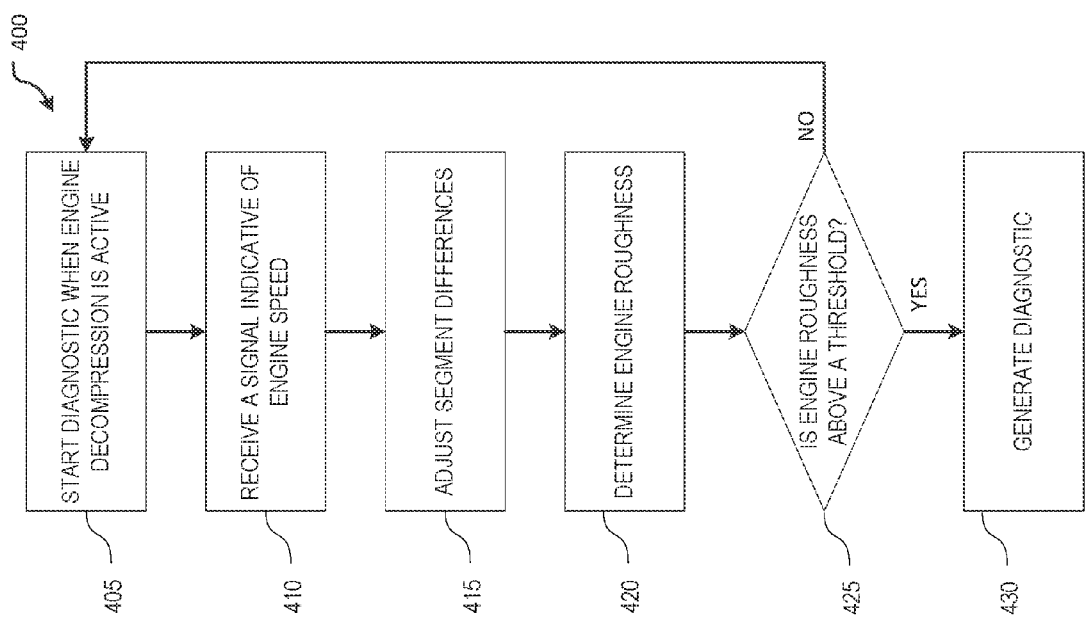
FIG. 4 is a flowchart of a method of performing diagnostics using the diagnostic system of FIG. 1 according to one embodiment.

FIG. 4 illustrates a diagnostic method 400 that occurs during engine decompression according to one embodiment. In the embodiment illustrated, the engine control unit 105 starts the diagnostic when active decompression is enabled (block 405). The engine control unit 105 receives a signal indicative of the engine speed from the engine speed sensor 120 (block 410). As discussed above, the engine control unit 105 analyzes the signal to determine whether engine decompression is occurring properly. In particular, the engine control unit 105 detects multiple segment times of the rotating crankshaft. Based on the detected segment times, the engine control unit 105 adjusts one or more of the segment times based on correction factors predetermined for the particular engine (block 415). The engine control unit 105 then uses the one or more segment times to determine the engine roughness (block 420). The engine control unit 105 compares the engine roughness to a predetermined threshold (block 425), and when the engine roughness is above the predetermined threshold, the engine control unit 105 generates a diagnostic signal and sends the diagnostic signal to the output diagnostic device 110 (block 430).

In the method 400, the diagnostic signal may only be generated and sent to the output diagnostic device 110 during the decompression mode where rapid heat up occurs. Thus, the diagnostic signal may be used as a status check of the rapid heat up functionality of the exhaust system. For example, if the diagnostic signal indicates a malfunction occurring during decompression, the exhaust system may not rapidly heat up as intended to obtain a reduction in harmful emissions. In some cases, a diagnostic system to monitor proper function of emission treatment systems is required for compliance with various laws and regulations. Therefore, the diagnostic system 100 may ensure compliance with emissions standards by providing a warning that emissions may be impacted by a malfunction in the rapid heat up functionality of the exhaust system.

Thus, embodiments provide, among other things, a system and a method of performing and diagnosing rapid heat up of an exhaust system during engine decompression based on measurements of engine speed. Various features and advantages of the invention are set forth in the following claims.

What is claimed is:

1. A diagnostic system for monitoring a vehicle, the diagnostic system comprising:
   a sensor configured to sense an operating speed of an engine of the vehicle;
   a diagnostic output device; and
   an electronic processor communicatively coupled to the sensor and the diagnostic output device, the electronic processor configured to
     activate a decompression mode of the engine;
     acquire the operating speed of the engine from the sensor;
     determine an engine roughness based on the operating speed of the engine; and
     when the engine roughness is above a threshold, send a diagnostic signal to the diagnostic output device.

2. The diagnostic system of claim 1, wherein the electronic processor is configured to acquire the operating speed of the engine by sensing a rotational speed of a crankshaft of the engine with the sensor.

3. The diagnostic system of claim 1, wherein the electronic processor is configured to acquire the operating speed of the engine by sensing a rotational speed of a camshaft of the engine with the sensor.

4. The diagnostic system of claim 1, wherein the electronic processor is further configured to open exhaust values in the engine when a fuel supply to the engine is inactive during the decompression mode.

5. The diagnostic system of claim 1, wherein the electronic processor is configured to activate the decompression mode of the engine when the electronic processor receives a request for rapid heat up of an exhaust system of the vehicle.

6. The diagnostic system of claim 1, wherein the electronic processor is configured to activate the decompression mode of the engine when a portion of an exhaust system of the vehicle is at a temperature that is below a temperature threshold.

7. The diagnostic system of claim 1, wherein the electronic processor is configured to send the diagnostic signal only when the decompression mode is active.

8. The diagnostic system of claim 1, wherein the electronic processor is configured to diagnose a malfunction occurring in the decompression mode of the engine.

9. The diagnostic system of claim 8, wherein the electronic processor is configured to diagnose the malfunction in the decompression mode of the engine by detecting a malfunction of one or more intake or exhaust valves of the engine during the decompression mode.

10. A method of performing diagnostics for a vehicle, the method comprising:
    activating, by an electronic processor, a decompression mode of an engine;
    acquiring, with the electronic processor, an operating speed of the engine from a sensor;

determining, with the electronic processor, an engine roughness based on the operating speed of the engine; and sending a diagnostic signal to a diagnostic output device when the engine roughness is below a predetermined threshold.

11. The method of claim 10, wherein acquiring the operating speed of the engine includes sensing a rotational speed of a crankshaft of the engine with the sensor.

12. The method of claim 10, wherein acquiring the operating speed of the engine includes sensing a rotational speed of a camshaft of the engine with the sensor.

13. The method of claim 10, the method further comprising: opening exhaust values in the engine when a fuel supply to the engine is inactive during the decompression mode.

14. The method of claim 10, wherein activating the decompression mode of the engine occurs when the electronic processor receives a request for rapid heat up of an exhaust system of the vehicle.

15. The method of claim 10, wherein activating the decompression mode of the engine occurs when a portion of an exhaust system of the vehicle is at a temperature that is below a temperature threshold.

16. The method of claim 10, wherein sending the diagnostic signal only occurs when the decompression mode is active.

17. The method of claim 10, the method further comprising: diagnosing a malfunction occurring in the decompression mode of the engine.

18. The method of claim 17, wherein diagnosing a malfunction occurring in the decompression mode of the engine includes detecting a malfunction of one or more intake or exhaust valves in the engine during the decompression mode.

* * * * *